United States Patent [19]

Echols, Jr.

[11] Patent Number: 5,205,061
[45] Date of Patent: Apr. 27, 1993

[54] MOVEMENT INDICATOR FOR FISHING ROD

[76] Inventor: David L. Echols, Jr., 9944 S. Prospect, Chicago, Ill. 60643

[21] Appl. No.: 815,383

[22] Filed: Dec. 23, 1991

[51] Int. Cl.$^5$ .............................................. A01K 87/00
[52] U.S. Cl. ................................................... 43/17.5
[58] Field of Search ................................ 43/17.5, 18.1

[56] References Cited

U.S. PATENT DOCUMENTS

| | | | |
|---|---|---|---|
| 1,190,872 | 7/1916 | Dildine | 43/17.5 |
| 2,012,894 | 8/1935 | Shoemaker | 43/18.1 |
| 2,565,633 | 8/1951 | Scott | 43/17.5 |
| 3,017,499 | 1/1962 | Fore | 43/17.5 |
| 3,678,590 | 7/1972 | Hayward | 43/17.5 |
| 4,026,059 | 5/1977 | Ochs | 43/17.5 |
| 4,586,284 | 5/1986 | Westwood | 43/17.5 |
| 4,617,751 | 10/1986 | Johansson | 43/17.5 |
| 5,083,247 | 1/1992 | Robinson | 43/17.5 |

FOREIGN PATENT DOCUMENTS

| | | | |
|---|---|---|---|
| 2836769 | 3/1980 | Fed. Rep. of Germany | 43/17.5 |
| 2052231 | 1/1981 | United Kingdom | 43/17.5 |
| 2170081 | 7/1986 | United Kingdom | 43/17.5 |

Primary Examiner—Kurt C. Rowan
Attorney, Agent, or Firm—Clement and Ryan

[57] ABSTRACT

A movement indicator assembly kit for use with a flexible fishing rod. Light from a light-emitting diode (LED) located adjacent to the inner end of the fishing rod is transmitted by at least one length of optical fiber to a reflector cap at the tip of the rod. In conditions of low visibility (nighttime, dusk or dawn), when a fish bites the light emitted by the reflector cap at the tip of the rod moves about and signals that the bite has occurred. A fishing rod with the movement indicator installed is also disclosed.

12 Claims, 1 Drawing Sheet

U.S. Patent   Apr. 27, 1993   5,205,061
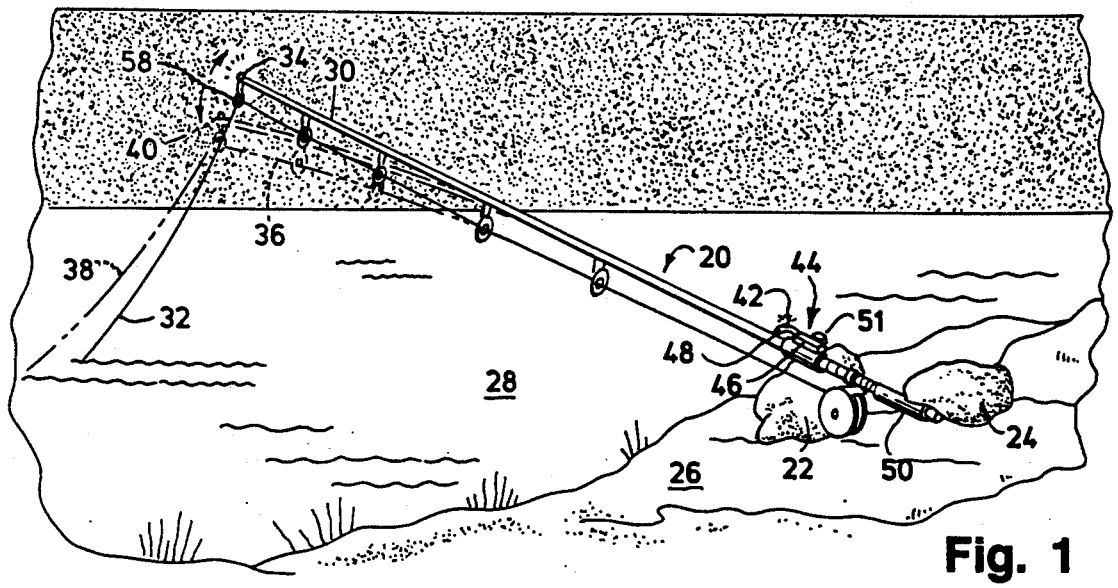
Fig. 1
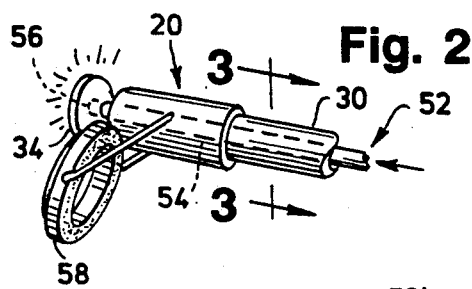
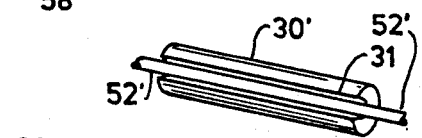
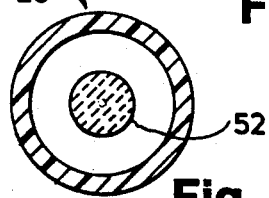
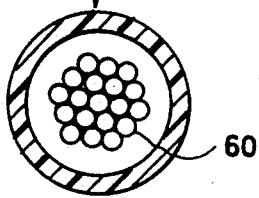
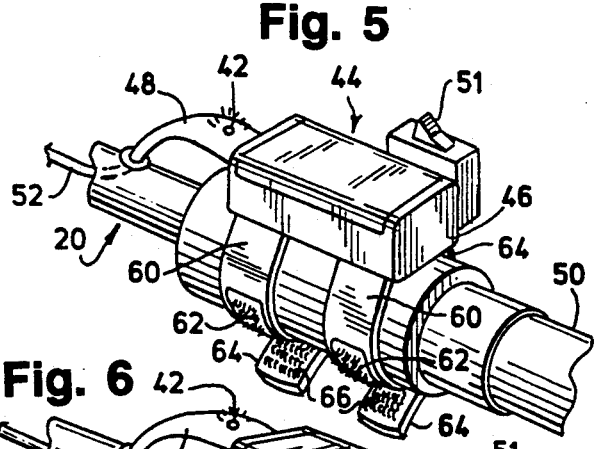
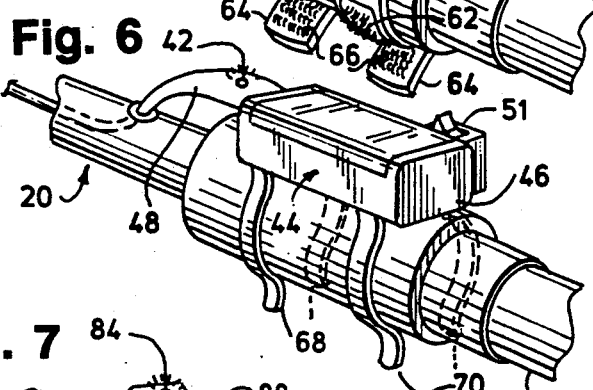
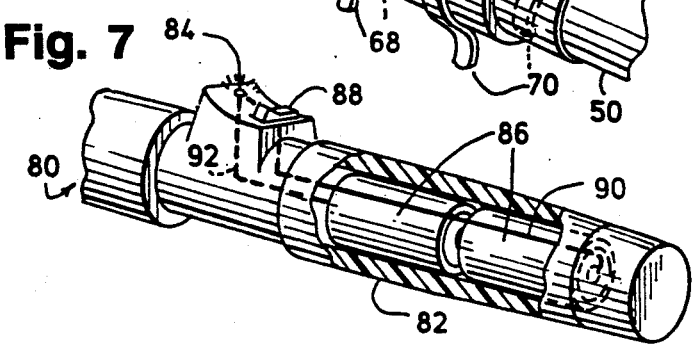

MOVEMENT INDICATOR FOR FISHING ROD

This invention relates to a movement indicator for use with a flexible fishing rod, and more particularly a movement indicator that utilizes a light-emitting diode, and to a kit from which such an indicator may be assembled on a fishing rod.

BACKGROUND OF THE INVENTION

A large number of devices have been available, some for as long as 60 years or more, to give a visual signal when a fish bites and pulls the outer end of a fishing rod into a bent position where it moves back and forth as the fish moves about in the water. Such devices are useful under conditions of low visibility, as for example during nighttime, or even at dusk or dawn.

Many of these movement indicators turn on a light only after there has been a bite, and in all these cases some type of apparatus having a relatively heavy weight is employed at or near the outer end of the fishing rod. Examples are the devices disclosed in U.S. Pat. Nos. No. 1,752,397 to See (1930), No. 2,671,209 to Habib (1954), No. 3,571,536 to Sparks (1971), No. 3,882,629 to Kaye (1975), No. 4,479,321 to Welstead (1984) and No. 4,766,688 to Hiles (1988). In the latter patent, the device is mounted on the fishing pole about halfway to two-thirds of the way up the rod from the handle (col. 3, lines 39-40), and in all the other instances the device is mounted at, or very near, the outer end of the rod. These relatively heavy weights at or near the outer end of the fishing rod interfere with the handling of the rod when it is held by the user—either when a single rod is being used, or when the rod is one of several rods that are anchored in a group on the bank of a river or lake and is picked up after a bite is signaled.

Some other movement indicating devices have utilized lamps that are on continuously, so that it is the movement of the light rather than the initial turning on of the light that signals a bite. Even in such case, the only prior art devices that are known to applicant require a relatively heavy weight to be carried by the outer end of the rod. (See U.S. Pat. Nos. 3,730,887 to Van Leeuwen (1973) and No. 4,376,349 to Yarkzower (1983).) This, again, interferes with the handling of the rod by the user.

The present invention utilizes a light-emitting diode located at the inner end of the rod as the source of the light that will signal movement of the outer end of the fishing rod, which eliminates altogether the need for any significant weight to be carried at the outer end of the rod. This arrangement is made possible by the use of optical fiber for transmitting the light from the light-emitting diode to the outer end of the fishing rod.

As indicated above, motion indicators for use with fishing rods have been available since 1930 or before. Light-emitting diodes have been available for many different applications for several decades. The transmission of visible light through strands of optical fiber has been known since at least the 1950's. Yet in this field of active development of various types of movement indicators for use on fishing rods, no one prior to applicant has recognized the very significant benefit of virtually eliminating any extra weight at the outer end of the fishing rod.

All the prior art devices referred to above, besides requiring undesirable weights at or near the tip of the fishing rod, require a relatively complicated arrangement of parts. In addition, because of the use of a light bulb with a filament, these prior art devices are relatively likely to suffer damage from breakage if the rod is dropped.

SUMMARY OF THE INVENTION

The movement indicator of this invention is used with a flexible fishing rod, preferably mounted in a casing. A light-emitting diode is secured to the fishing rod near the inner end of the rod, preferably mounted in a casing. The casing is adapted to house a source of electrical power such as conventional dry cell batteries, and a switch is provided for connecting and disconnecting the light-emitting diode and the source of electrical power.

A light-transmitting reflector cap, preferably formed of some lightweight plastic material, is attached to the outer end of the fishing rod. The reflector cap is at least translucent, and may be transparent. At least one length of optical fiber is selectively housed within the fishing rod, or attached to the outside of the fishing rod, as desired, to connect the light-emitting diode and the reflector cap. The outer end portion of each of the at least one length of optical fiber thus employed is positioned entirely within the body of the reflector cap.

The casing just described can be attached to the fishing rod by any suitable connection means. For example, one strap member carrying a multiplicity of small loops and a second strap member carrying a multiplicity of small hooks can be used to form an attachment such as is effected by the material commonly sold under the trademark VELCRO. If desired, the casing can be secured to the fishing rod by flexible clip means. Or, it may be permanently attached to the rod if that is preferred.

Various embodiments of an assembly kit from which the device of this invention can be assembled on a fishing rod are disclosed. Various combinations of a fishing rod with the device of the invention assembled thereon are disclosed as well.

ADVANTAGES OF THE INVENTION

The movement indicator of the present invention has several advantages over those disclosed in the prior art.

In the instant invention the outer end portion of the fishing rod carries a member having a wholly insignificant weight, in the form of a small light-transmitting reflector cap. This component is so small that it does not change the balance of the rod, or interfere in any other way with the handling of the rod by the user.

In addition, the device of this invention does not include a light bulb incandescent filament that can break if the fishing rod with the movement indicator device attached is dropped.

The construction of the device is very simple, and it includes no vibratory switch, mercury switch, gravity-actuated switch or other type of circuit-closing switch such as those used in the prior art.

Because in the device of this invention there is no necessity for an electrical conductor between the handle and the outer end of the fishing rod, it is believed that there is substantially less chance of the person using the rod receiving a shock during an electrical storm.

BRIEF DESCRIPTION OF THE DRAWING

The invention will now be described in more detail by reference to the accompanying drawing, in which:

FIG. 1 is a perspective view of a fishing rod in combination with the movement indicator of this invention, the rod being anchored on the bank of a river or pond with the hook and the end of the line submerged in the body of water;

FIG. 2 is a fragmentary, enlarged perspective view of the outer end portion of the fishing rod of FIG. 1;

FIG. 3 is a cross sectional view of the fishing rod of FIG. 1, taken along line 3—3 in FIG. 2, showing a single length of optical fiber housed within the hollow fishing rod of FIG. 1;

FIG. 4 is a similar cross-sectional view showing a plurality of lengths of optical fiber housed within the hollow fishing rod of FIG. 1;

FIG. 4A is a fragmentary view of a portion of a fishing rod and a single length of optical fiber positioned in a groove that extends longitudinally along the exterior surface of a solid fishing rod;

FIG. 5 is a fragmentary, enlarged view of a portion of the handle of the fishing rod of FIG. 1, showing the casing for housing the light-emitting diode and a source of electrical power connected to the handle by means of straps carrying material commonly sold under the trademark VELCRO;

FIG. 6 is a similar perspective view showing the casing in question attached to the handle of the fishing rod of FIG. 1 by clip means; and FIG. 7 is a perspective view of a fishing rod in which the handle is hollow and comprises the casing for housing a light-emitting diode and a source of electrical power such as a pair of dry cell batteries.

DETAILED DESCRIPTION OF PREFERRED EMBODIMENTS

Anchored Fishing Rod

One useful application of the movement indicator of this invention is with a fishing rod that is anchored in any suitable manner on the bank of a river, pond, lake or other body of water for nighttime fishing.

FIG. 1 shows a typical fishing rod 20 anchored between rocks 22 and 24, which rest on bank 26 of body of water 28. This rod may be a single rod, or one of a group of several fishing rods similarly anchored that are being tended by the same person.

Rod 20 in this embodiment is a hollow, flexible fishing rod, with the movement indicator of this invention incorporated as original equipment in the rod. The invention disclosed in this application and defined in the attached claims includes both (1) a movement indicator assembly kit for attachment to a pre-existing fishing rod, and (2) a fishing rod such as rod 20 (whether hollow or solid) that has the movement indicator incorporated in the rod as it is manufactured and sold.

Outer end portion 30 of rod 20 is shown in FIG. 1 in the position it occupies after line 32, with the fishhook and bait attached, is dropped into body of water 28. At this time, light-transmitting reflector cap 34 has the position shown in FIG. 1.

Reflector cap 34 (lighted as explained below) is formed of a material that is at least translucent, and may be transparent. Any suitable lightweight plastic material, for example, may be used. Because it will produce more visible light, a material that is not entirely transparent, but is only translucent, is preferred.

When there is a bite on line 32, the outer end of fishing rod 20 moves into position 36, as the fish pulls the line into position 38. At this time, the reflector on the outer end of the rod moves into position 40 as the fish tugs on line 38, and then into various other positions as the fish moves around in the water. Reflector cap 34 moves about as the fish starts in one direction or the other, and this provides the person using fishing rod with an immediate indicator of the bite on the line.

As mentioned above, a single fishing rod may be anchored as shown in FIG. 1 or the rod may be one of several rods anchored along a bank. The movement indicator of this invention may also of course be used to advantage when the rod is not anchored in this way but is held manually by the user at all times.

Light-Emitting Diode

The light that signals movement of end portion 30 of fishing rod 20 in the manner described is provided by light-emitting diode (LED) 42. As seen on the right-hand side of FIG. 1, in this embodiment means for housing LED 42 is provided in the form of casing 44, which is comprised of box-like portion 46 and forwardly protruding nose portion 48.

As used in this specification and the accompanying claims, the reference to means for "housing" the LED, or for "housing" the source of electrical power or length of optical fiber described below, includes any suitable means for housing, containing, mounting, incorporating or otherwise supporting the component in question on the fishing rod. When the means for housing the LED is referred to in this specification or in the claims as being in addition adapted to house a source of electrical power, the means having these two functions is preferably integrally formed, but if desired it may be comprised of two parts separately located on the fishing rod.

The light-emitting diode may be completely enclosed or only partially enclosed, as desired. If it is only partially enclosed and is thus visible to the user of the fishing rod, this will provide a convenient means of checking to see if the motion indicator is in proper working order. The LED is preferably installed in such a way that it can be replaced if for any reason it becomes inoperative.

Light-emitting diode 42 is operatively connected to a source of electrical power that is also housed in casing 44. The casing is secured to fishing rod 20 adjacent to inner end portion 50 of the rod. FIGS. 5 and 6 show two methods of attaching such a casing to the fishing rod.

The source of electrical power housed in casing 44 may be a pair of conventional dry cell batteries (best seen in FIG. 7) of any suitable size, such as size AAA. The light emitted by LED 42 may be any of several suitable colors emitted by conventional light-emitting diodes. For greatest visibility, orange is preferred, yellow is also effective, and red is satisfactory the light-emitting diode should be of a large enough size (for example, a 2,000 to 3,000 mcd. LED) to produce a light of sufficient intensity that it will make reflector cap 34 at the outer end of the fishing rod readily visible under all likely conditions of use.

Optical Fiber Connecting LED and Reflector Cap

When switch 51 is closed after rod 20 has been anchored as shown in FIG. 1, electromotive force from the source of electrical power in casing 44 is applied across LED 42. The resulting light from the LED is transmitted to reflector cap 34 by at least one length of optical fiber that operatively connects LED 42 to the reflector cap. Length of optical fiber 52 in this embodiment is a single strand, as is best seen in cross section in FIG. 2, where its outer end 54 is housed within hollow fishing rod 20.

As indicated in FIG. 2, outer end portion 56 of length of optical fiber 52 is for best results positioned entirely within the body of cap 34.

In FIG. 2, grommet 58 through which fishing line 32 passes is shown in the position it occupies when fishing rod 20 is anchored on the bank of a body of water as illustrated in FIG. 1.

If desired, a bundle of a plurality of lengths of optical fiber 60 such as indicated in FIG. 4 may be used to transmit light from LED 42 to reflector cap 34. In either event, it is preferred for maximum transference of light to use a length of optical fiber, or lengths of optical fibers, of as large total cross-sectional area as can be housed within a hollow fishing rod or conveniently carried outside a solid fishing rod.

Whether the combination fishing rod and movement indicator of this invention are embodied in the rod as it is manufactured and sold, or in a rod as modified after its original purchase, the rod may be either hollow or solid in form. If the fishing rod is hollow, the length or lengths of optical fiber may be threaded through the hollow rod or merely secured to the outer walls of the rod, as desired.

If the optical fiber is secured to the outside of the fishing rod, whether hollow or solid, it is advantageous to provide a longitudinal groove along the rod in which to position the fiber. In FIG. 4A, single length of optical fiber 52' is positioned in groove 31, which extends longitudinally along the exterior surface of fishing rod 30'.

Securing Of Casing To Fishing Rod

FIGS. 5 and 6 illustrate alternative methods of attaching casing 44, which houses LED 42 and the source of electrical power for the light-emitting diode, to fishing rod 20 adjacent to inner end 50 of the rod.

FIG. 5 illustrates a pair of two-piece connectors each of which comprises one strap member 60 that carries a multiplicity of small loops 62 and a second strap member 64 that carries a multiplicity of small hooks 66. Materials effecting this mode of attachment are commonly sold under the trademark VELCRO. As best seen in the lower right-hand portion of FIG. 5, each strap member 60 is wrapped around fishing rod 20 from one direction, and each strap member 64 from the other, to confine the rod between the two members. If properly dimensioned and located, a single two-piece connector of this type can be employed, if desired, to attach the casing to the fishing rod.

FIG. 6 illustrates the mode of attachment of casing 44 to fishing 20 through two pairs of opposed flexible clip means 68 and 70. Again, a single pair of opposed clip means can be employed if properly dimensioned and located.

FIG. 7 illustrates an embodiment of this invention in which fishing rod 80 has a generally cylindrical, hollow handle 82. In this embodiment, the casing that houses LED 84 and a source of electrical power is comprised of the walls of the hollow handle of the fishing rod. As shown, source of electrical power 86 may be a pair of conventional dry cell batteries. LED 84 may be connected to and disconnected from batteries 86 through water proof switch 88, and through lead 90 (which passes through the switch) and lead 92, both of which leads are illustrated diagrammatically in FIG. 7.

As already indicated above, the casing for the light-emitting diode may, if desired, be permanently secured to the fishing rod by any suitable means of attachment.

While the present invention has been described above and illustrated in the accompanying drawing in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

I claim:

1. A movement indicator assembly kit for use with a flexible fishing rod, which comprises:
   (a) a light-emitting diode;
   (b) means for operatively connecting said light-emitting diode to a source of electrical power;
   (c) switch means for connecting and disconnecting said light-emitting diode and said source of electrical power;
   (d) a casing for housing said light-emitting diode, said casing (i) being in addition adapted to house a source of electrical power, and (ii) being adapted to be secured to said fishing rod adjacent the inner end of the rod;
   (e) a light-transmitting reflector cap adapted to be attached to the outer end portion of said fishing rod; and
   (f) at least one length of optical fiber for operatively connecting said light-emitting diode and said reflector cap, said at least one length of optical fiber being adapted to be selectively housed within the fishing rod or attached to the outside of the fishing rod, as desired, whereby when said various means and members are assembled on said flexible fishing rod together with a source of electrical power and said switch means is turned on, any movement of the outer end of the fishing rod will be indicated by the light that is transmitted from the light-emitting diode through said at least one length of optical fiber to the reflector cap.

2. The movement indicator assembly kit of claim 1 in which said casing for housing said light-emitting diode and adapted to house a source of electrical power is adapted to be attached to the fishing rod by means of at least one two-piece connector that comprises one strap member carrying a multiplicity of small loops and a second strap member carrying a multiplicity of small hooks that are adapted to engage said small loops on the first strap member when said two strap members are wrapped around the fishing rod with the rod confined between said two members.

3. The movement indicator assembly kit of claim 1 in which said casing for housing the light-emitting diode and adapted to house a source of electrical power is adapted to be secured to the fishing rod by at least one pair of opposed, flexible clip means.

4. The movement indicator assembly kit of claim 1 which includes a plurality of lengths of optical fiber for operatively connecting said light-emitting diode and said reflector cap.

5. The movement indicator assembly kit of claim 1 in which the outer end portion of each of said at least one length of optical fiber is positioned entirely within the body of said reflector cap.

6. The movement indicator assembly kit of claim 1 in which said reflector cap is formed of a translucent material.

7. The movement indicator assembly kit of claim 1 in which said light-emitting diode is adapted, when said switch means operatively connects the light-emitting diode and the source of electrical power, to emit light that is orange in color.

8. The movement indicator assembly kit of claim 1 in which the light-emitting diode is only partially enclosed in said casing for housing the same.

9. A movement indicator assembly kit for use with a flexible fishing rod which comprises:
   (a) a light-emitting diode adapted, when operatively connected to a source of electrical power, to emit light that is orange in color;
   (b) means for operatively connecting said light-emitting diode to a source of electrical power;
   (c) switch means for connecting and disconnecting said light-emitting diode and said source of electrical power;
   (d) a casing for housing said light-emitting diode, said casing (i) being in addition adapted to house a source of electrical power, and (ii) being adapted to be secured to said fishing rod adjacent the inner end thereof by means of a pair of two-piece connectors each of which comprises one strap member carrying a multiplicity of small loops and a second strap member carrying a multiplicity of small hooks that are adapted to engage said small loops on the first strap member when said two strap members are wrapped around the fishing rod with the rod confined between said two members;
   (e) a light-transmitting reflector cap adapted to be attached to the outer end of said fishing rod, said reflector cap being formed of a translucent material; and
   (f) at least one length of optical fiber for operatively connecting said light-emitting diode and said reflector cap, said at least one length of optical fiber being adapted to be selectively attached to the outside of the fishing rod or housed within the fishing rod, as desired, the outer end portion of each of said at least one length of optical fiber being positioned entirely within the body of said reflector cap.

10. A flexible fishing rod in combination with a movement indicator assembled from an assembly kit according to any one of claims 1 through 9, in which:
    (i) said casing for housing the light-emitting diode and adapted to house a source of electrical power is secured to the fishing rod adjacent the inner end of the rod,
    (ii) said reflector cap is attached to the outer end portion of the fishing rod, and
    (iii) said at least one length of optical fiber extends substantially from the inner end portion to the outer end portion of the rod and is operatively connected at one end to the light-emitting diode and at the other end to the reflector cap.

11. The combination fishing rod and movement indicator of claim 10 in which:
    (i) the fishing rod is hollow, and
    (ii) said at least one length of optical fiber is housed within the hollow fishing rod.

12. A flexible fishing rod in combination with a movement indicator assembled from an assembly kit according to claim 1 or 9, in which:
    (i) said fishing rod has a generally cylindrical, hollow handle,
    (ii) said casing for housing the light-emitting diode and adapted to house a source of electrical power is comprised of the walls of said hollow handle of the fishing rod,
    (iii) said reflector cap is attached to the outer end portion of the fishing rod, and
    (iv) said at least one length of optical fiber extends substantially from the inner end portion to the outer end portion of the rod and is operatively connected at one end to the light-emitting diode and at the other end to the reflector cap.

* * * * *